(12) United States Patent
Gray

(10) Patent No.: US 7,059,421 B2
(45) Date of Patent: Jun. 13, 2006

(54) WEED EXTRACTING DEVICE

(76) Inventor: Ronald E. Gray, 100 Sapphire Place, Sequim, WA (US) 98382

( * ) Notice: Subject to any disclaimer, the term of this patent is extended or adjusted under 35 U.S.C. 154(b) by 0 days.

(21) Appl. No.: 10/924,530

(22) Filed: Aug. 23, 2004

(65) Prior Publication Data

US 2006/0037301 A1 Feb. 23, 2006

(51) Int. Cl.
*A01B 1/00* (2006.01)

(52) U.S. Cl. ............... 172/378; 172/374; 172/379
(58) Field of Classification Search .......... 172/25, 172/371, 372, 373, 374, 377, 378, 379; 56/400.04, 56/400.05, 400.06, 400.07, 400.11, 400.12
See application file for complete search history.

(56) References Cited

U.S. PATENT DOCUMENTS

| 698,715 | A | * | 4/1902 | Knight ............... 294/50.6 |
| 3,282,567 | A | * | 11/1966 | Weniger ............... 254/132 |
| 3,767,251 | A | * | 10/1973 | San Filipo ............ 294/50.8 |
| 4,400,029 | A | | 8/1983 | Delpidio |
| 4,547,010 | A | | 10/1985 | Camp |
| 4,618,003 | A | * | 10/1986 | Hostetter ............... 172/25 |
| 4,641,712 | A | | 2/1987 | Cravotta |
| 4,673,165 | A | | 6/1987 | Nelson et al. |
| 4,715,634 | A | | 12/1987 | Mueller et al. |
| 4,730,864 | A | * | 3/1988 | Sample ............... 294/50.9 |
| 5,154,465 | A | | 10/1992 | Pakosh |
| 5,402,853 | A | * | 4/1995 | Tauber ............... 172/378 |
| 5,467,830 | A | | 11/1995 | Watson |

(Continued)

FOREIGN PATENT DOCUMENTS

GB 2183433 * 6/1987

(Continued)

OTHER PUBLICATIONS

Weedpro II printout, myweedpro.com.

*Primary Examiner*—Victor Batson
(74) *Attorney, Agent, or Firm*—QuickPatents.com; Kevin Prince

(57) ABSTRACT

A weed extraction tool is disclosed, comprising an elongated handle, a prong assembly, and a step assembly. The prong assembly includes a rod having a plurality of prongs attached at a lower end thereof and a pivot pin holder near its center. The step assembly comprises a flat step portion at one end, a plurality of fingers at another end, and two sides near the center of and under the step assembly. An opening is formed in the top side proximate its center, and each side includes a side opening. The rod of the prong assembly is inserted through the opening in the top side of the step assembly such that a pivot pin may be inserted through one side of the step assembly, through the pivot pin holder, and through the other side of the step assembly, so as to pivotably fix the prong assembly to the step assembly. As such, the opening of the top side of the step assembly is sufficient only to allow the step assembly to pivot between closed and open positions with respect to the prong assembly. In the open position the user may step on the step assembly to burry the prongs into a portion of ground adjacent to a weed. Then, while the handle is pulled towards the user, pivoting the step assembly around its contact point with the ground, the step assembly is forced into its closed position with respect to the prong assembly, the fingers pressing the weed against the prongs so as to firmly hold the weed therebetween while the handle is pulled towards the user to fully remove the weed from the ground.

9 Claims, 6 Drawing Sheets

U.S. PATENT DOCUMENTS

| | | |
|---|---|---|
| 5,535,833 A | 7/1996 | Mathews |
| 5,857,529 A * | 1/1999 | Nguyen ..................... 172/378 |
| 6,016,876 A | 1/2000 | Rountree et al. |
| 6,257,346 B1 | 7/2001 | Schofield et al. |
| 6,691,793 B1 | 2/2004 | Ota |
| 2001/0045293 A1 * | 11/2001 | Tam ........................... 172/378 |
| 2004/0065452 A1 * | 4/2004 | Baker ........................ 172/378 |

FOREIGN PATENT DOCUMENTS

| | | | |
|---|---|---|---|
| GB | 2233539 | * | 1/1991 |

* cited by examiner

WEED EXTRACTING DEVICE

FIELD OF THE INVENTION

The present invention relates generally to garden tools and, more particularly, to an improved weed extracting device.

BACKGROUND AND RELATED ART

There are a variety of weed extracting devices in the prior art that use various types of mechanisms to extract weeds with the goal of pulling the roots out of the ground intact. Some of these prior art devices serve to cut the underground roots of the weed to facilitate removal thereof. For example, U.S. Pat. No. 4,715,634 Mueller et al. on Dec. 29, 1987 discloses such a device. However, by leaving the roots in the ground, such devices do not prevent the weed from regenerating and, indeed, by a larger number. As such, devices that simply pull the weed until it is separated from its roots, such as U.S. Pat. No. 5,154,465 Pakosh on Oct. 13, 1992, and devices that cut the roots while underground, are not ultimately helpful in the fight against unwanted growth of weeds.

Other devices aim to remove the whole weed, roots and stem, from the ground intact. For example, U.S. Pat. No. 4,673,165 Nelson et al. on Jun. 16, 1987, discloses a device that pulls the weed out of the ground by gripping a large portion of both the stem and roots simultaneously. The Nelson et al. device also has the advantage of using leverage to clamp down upon the weed and simultaneously remove the weed from the ground, which is otherwise unique in the prior art. Thus even someone without a relatively large amount of strength is able to effectively weed with such a device.

This device, however, relies on the user manually pushing prongs of the device into the ground by hand force on the handle. Many people find this difficult to do, particularly with dry soil and particularly those who are relatively light weight. Using the foot to push the probe into the ground is much more effective and comfortable, and several prior art devices have foot steps or the like just for this purpose. See U.S. Pat. No. 4,281,866 Atcheson on Aug. 4, 1981, as an example of a weed pulling device having a foot step. It would be difficult to find a place to mount a foot-step onto the Nelson et al. device, since much of its mechanism is precisely where one's foot would need to rest to force the prongs of such a device into the ground.

Therefore, there is clearly a need for a weed extraction device that is easy for even people who are relatively weak or light-weight to use for extended periods of time. Such a needed device would have a weed clamping mechanism based on leverage and would be inserted into the ground by force applied to a foot step to facilitate deep penetration of the prongs into even very dry soil. Such a needed device would be easy to manufacture, transport, and store, and would be effective at pulling weeds out with their roots intact. The present invention accomplishes these objectives.

SUMMARY OF THE INVENTION

The present invention is a weed extraction tool comprising an elongated handle, a prong assembly, and a step assembling. The prong assembly includes a rod having at a lower end thereof a plurality of prongs, and at an upper end a fastener for coaxially fastening to a lower end of the handle. The prongs form a V-shape such that roots of a weed may be forced between the prongs and captured thereby. A pivot pin holder is fixed between the upper end and the lower end of the rod and adapted for holding a pivot pin.

The step assembly comprises a generally flat step portion at one end thereof, and a plurality of fingers at another end thereof. Two half-oval shaped sides are attached near the center of and under the step assembly so as to provide additional strength beneath the step portion. An opening is formed in the top side proximate its center, and each side includes a side opening.

During the assembly of the apparatus, the rod of the prong assembly is inserted through the opening in the top side of the step assembly such that the pivot pin holder becomes aligned with the side openings of both sides of the step assembly. The pivot pin is then inserted through the opening of one of the sides of the step assembly, through the pivot pin holder of the prong assembly, and out through the opening of the other side, so as to pivotably fix the prong assembly with the step assembly. A washer and cotter pin secure the pivot pin in place.

As such, the opening of the top side of the step assembly is sufficient only to allow the step assembly to pivot between a closed position with respect to the prong assembly, and an open position with respect to the prong assembly. In the closed position, the fingers contact the prongs so as to firmly hold the weed therebetween while removing the weed from the ground. The fastener of the rod is then inserted into and fasted to the means for fastening of the lower end of the elongated handle and tightened to a point where the axis of the rod at the prongs is coplanar with the axis of the top end of the handle.

In use, a user inserts the prongs slightly into a portion of ground just in front of a weed. The user then uses one foot to step onto the step portion to force the prongs deeper into the ground. This also forces the step assembly into the fully open position. Once the prongs are sufficiently buried next to the roots of the weed, the user grasps the hand grip and pulls towards himself such that the step assembly contacts the ground. The user may either remain with a foot on the step portion or not, depending upon what is comfortable to the user. At this point, as the user continues to pull the handle towards himself, the step assembly begins to be forced into its closed position, pressing the fingers of the step assembly around the weed. Simultaneously, the apparatus pivots around the contact point of the step assembly and the ground, forcing the prongs up and out of the ground. Finally, as the prongs are pulled from the ground, the fingers close completely around the weed and the device lifts the weed and its roots completely out of the ground. The leverage afforded by the elongated handle facilitate the removal of the weed even when the weed is fairly large with deep roots, and even when the ground is relatively dry and compact.

The invention as described results in an implement that is well suited for quickly and easily removing a weed from the ground without having to bend over or apply excessive manual force to a handle. The apparatus is easily inserted into even dry and compact soil by stepping down onto the step portion of the step assembly. Moreover, the present invention allows for removal of most of the weed still intact, since the prongs of the device contact the weed along its roots in multiple locations while lifting the root out of the ground. When disassembled, the components of the device may be arranged to lie relatively flat, facilitating the packaging, transportation, storage, and display thereof, particularly in a retail shopping environment such as a garden store. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
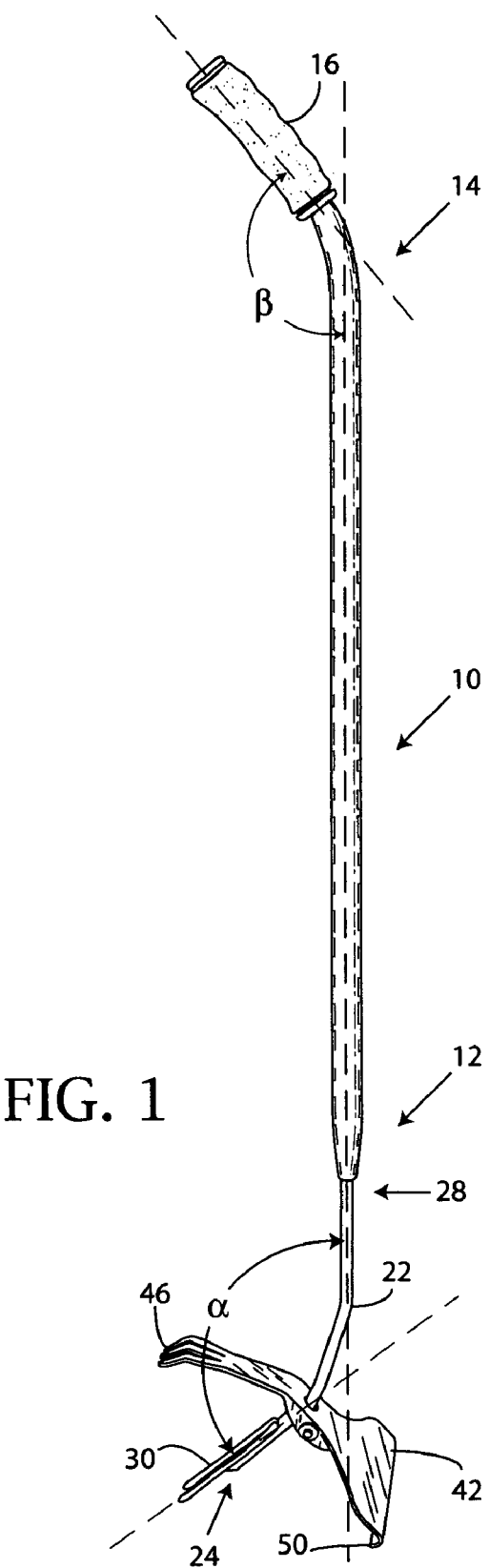
FIG. 1 is a perspective view of the invention, illustrating an elongated handle, a prong assembly, and a step assembly of the invention.
Figure 6:
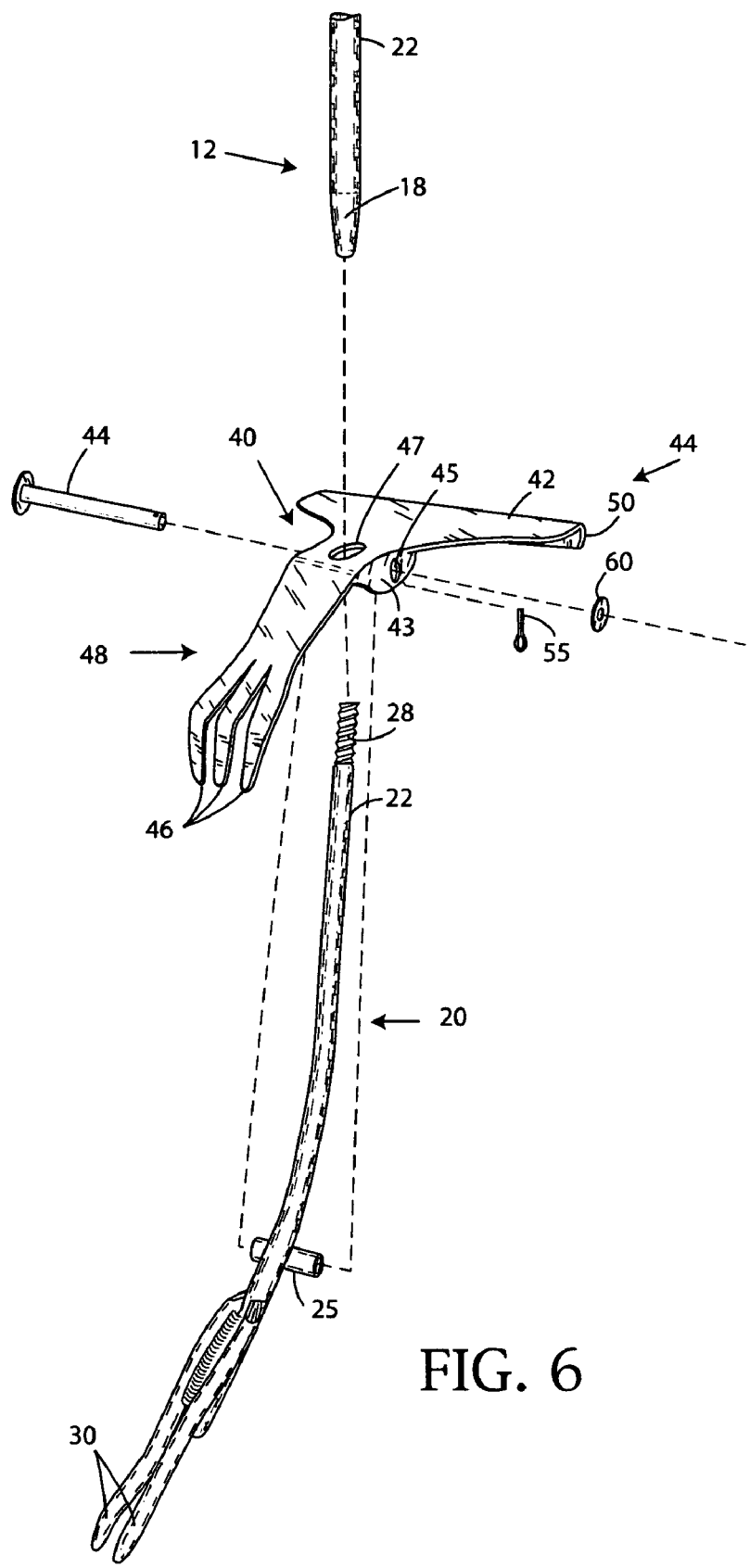
FIG. 6 is an exploded view of the invention, illustrating the assembly of the handle with the step assembly and the prong assembly.

FIGS. 1 and 6 illustrate a weed extraction tool comprising an elongated and generally cylindrical handle 10, a prong assembly 20, and a step assembly 40. A lower end 12 of the elongated handle 10 includes a means for fastening 18, such as a threaded opening, for receiving a fastener 28 of a rod 22 of the prong assembly 20. When the fastener 28 is engaged with the means for fastening 18, the axis of the rod 22 is coaxially aligned with the axis of the elongated handle 10. The handle 10 may be made from an elongated wooden stock material, or a rolled or extruded metallic material, such as aluminum. The means for fastening 18 may be a hardened steel nut embedded into the lower end 12 of the handle 10, or the threads may be bored into the material of the handle 10 itself.

The prong assembly 20 includes a metallic rod 22 having at a lower end 24 thereof a plurality of prongs 30, preferably two metallic prongs 30, and at an upper end 26 the fastener 28, preferably being a threaded section of the rod 22. The prongs 30 form a V-shape (FIG. 3) such that roots of a weed 70 may be forced between the prongs 30 and captured thereby. The prongs 30 are either formed from the rod 22 by hot metal stamping, or the rods 30 are welded onto the rod 22. A pivot pin holder 25, such as a metallic cylinder, is fixed between the upper end 26 and the lower end 24 of the rod 22 by welding, said pivot pin holder 25 being transversely mounted to the axis of the rod 20 as shown in FIG. 6. The pivot pin holder 25 is adapted for holding a pivot pin 35 (FIGS. 2 and 6).

Preferably the rod 22 is bent such that the axis of the rod 22 at the prongs 30 forms an angle α with the axis of the rod 22 at the upper end 26 thereof, the angle α preferably being approximately 135° (FIG. 1), although any angle between 110° and 180° would be sufficient.

Figure 2:
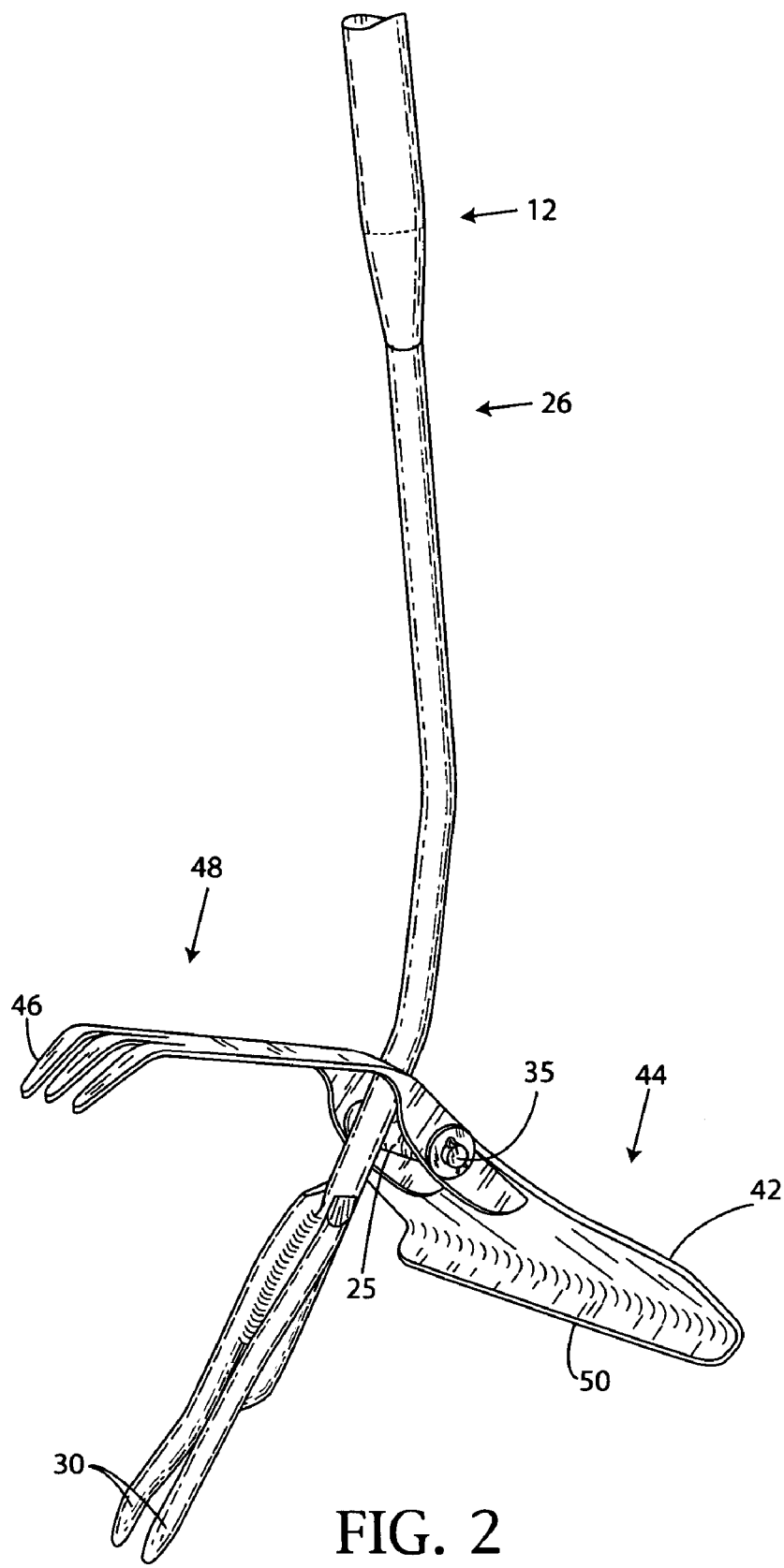
FIG. 2 is a partial perspective view of the invention, illustrating the prong assembly and step assembly, and illustrating fingers of the step assembly in an open position with respect to prongs of the prong assembly.
Figure 3:
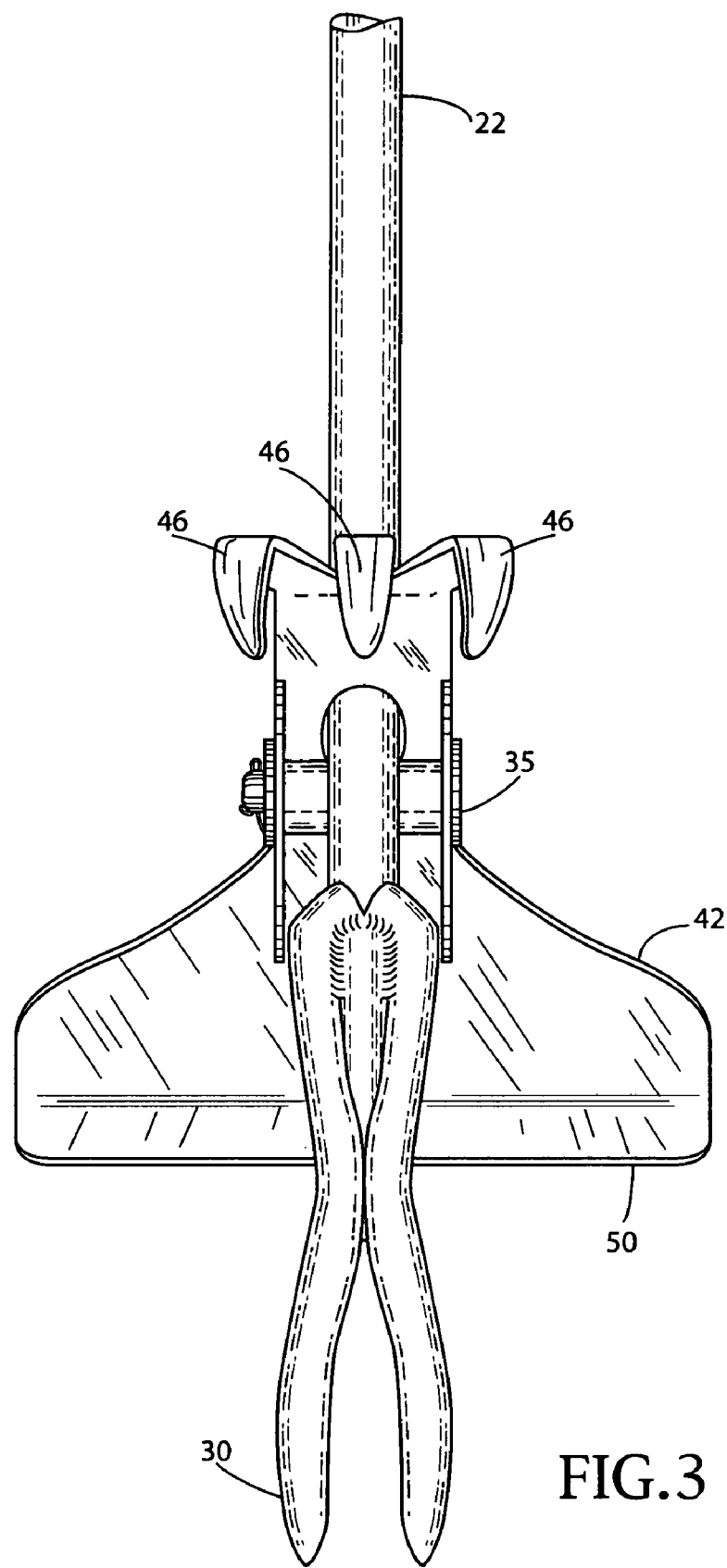
FIG. 3 is a partial front elevational view of the invention, illustrating the fingers in the open position with respect to the prongs.
Figure 4:
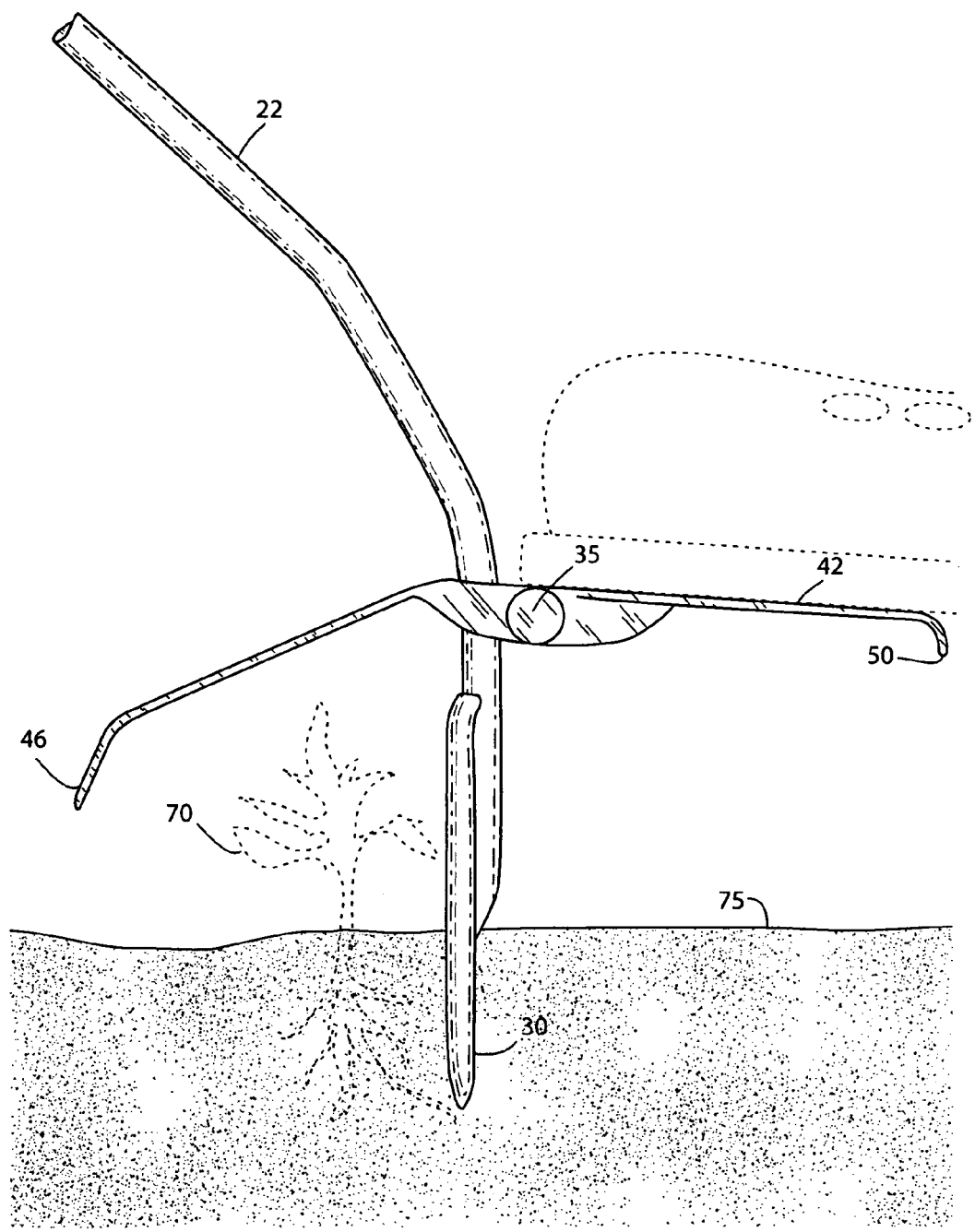
FIG. 4 is a partial left side elevational view of the invention, illustrating the prongs as being inserted just behind a weed into a portion of ground.
Figure 5:
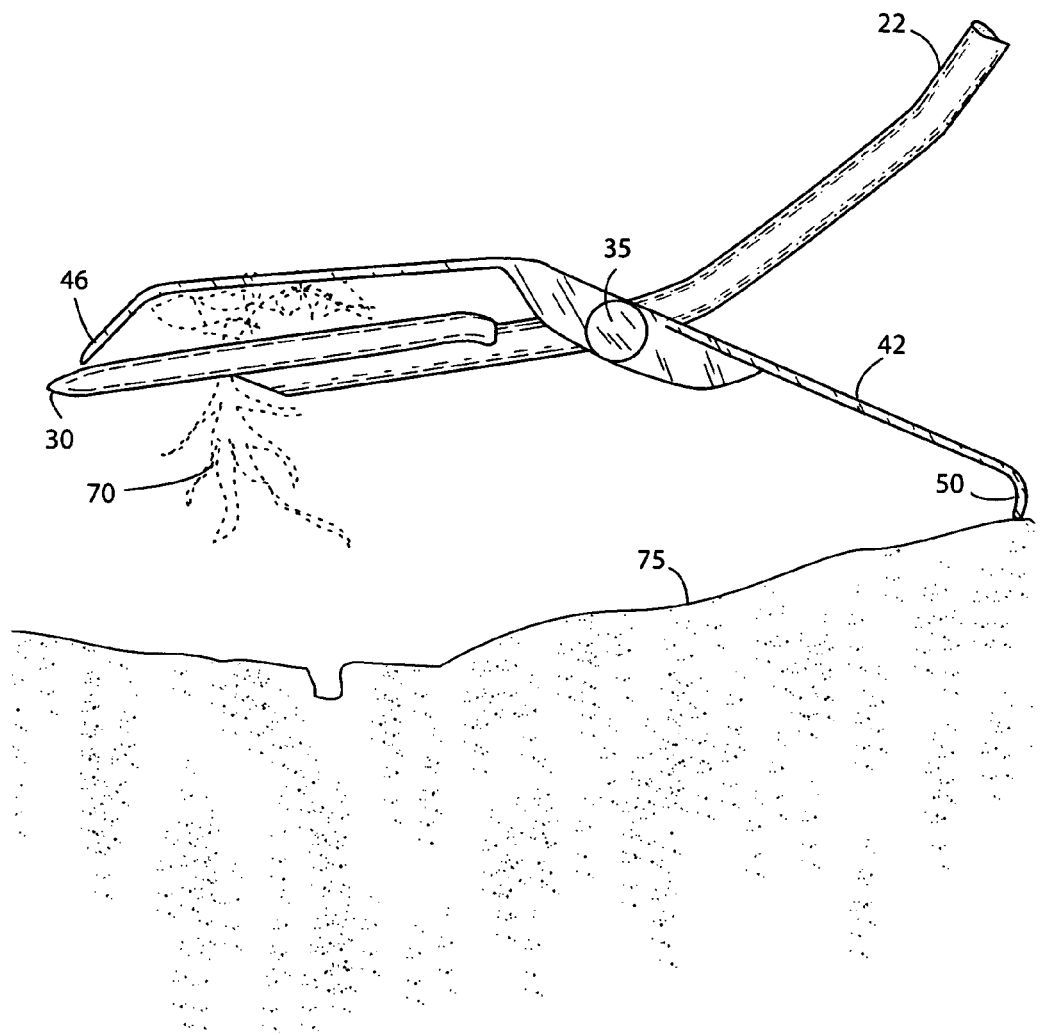
FIG. 5 is a partial left side elevational view of the invention, illustrating the fingers in the closed position, clamping the pulled weed between the prongs and fingers.

The step assembly 40 comprises a generally flat step portion 42 at one end 44 thereof, and a plurality of fingers 46, preferably three fingers 46, at another end 48 thereof (FIGS. 2 and 6). The step assembly 40 is preferably formed from a generally flat sheet metal material that is stamped and then bent as prescribed. Two half-oval shaped sides 43 are attached, such as by welding, below the step assembly 40 at its side edges so as to provide additional strength beneath the step portion 42 (FIG. 2). An opening 47 is formed in the top side 49 proximate the center of the top side 49. Further, each side 43 includes a side opening 45 (FIG. 6). A flange 50 at the one end 41 of the step assembly 40 is included that forms an approximate right angle with the top side 49 (FIGS. 2, 4 and 5). Further, the end 48 is bent slightly downward with respect to the top side 49, preferably between 25° to 35° (FIGS. 4 and 5). The fingers 46 are themselves each bent downward with respect to the end 48, preferably between 30° to 40°.

The axis of the handle 10 at the top end 14 forms an angle β with the axis of the rest of the handle 10 (FIG. 1). The angle β is preferably approximately 135°. Such an angle β facilitates the user pulling the handle 10 down and towards the user during operation, described below. In the case where the handle 10 is formed of wood, the tope end 14 of the handle may be a handle attachment (not shown) that slides over the wooden top-most portion of the handle 10 and includes the prescribed angle β formed therein. However, in the case where the handle 10 is formed from a metal material, the handle 10 may be bent so as to form the angle β.

FIG. 6 illustrates the assembly of the apparatus, wherein the rod 22 of the prong assembly 20 is inserted through the opening 47 in the top side 49 of the step assembly 40 such that the pivot pin holder 49 becomes aligned with the side openings 45 of both sides 43 of the step assembly 40. The pivot pin 35 is then inserted into the opening 45 of one of the sides 43 of the step assembly 40, through the pivot pin holder 25 of the prong assembly 20, and out through the opening 45 of the other side 43, so as to pivotably fix the prong assembly 20 with the step assembly 40. A washer 60 and cotter pin 55 are preferably used to secure the pivot pin 35 in place, although any number of like fasteners could be readily used, such as a lock washer and a nut (not shown), or the like.

As such, the opening 47 of the top side 49 of the step assembly 40 is sufficient only to allow the step assembly 40 to pivot between a closed position with respect to the prong assembly 20 (FIG. 5), and an open position with respect to the prong assembly 20 (FIG. 4). In the open position shown in FIG. 4, the step portion 42 of the step assembly 40 forms an approximate right angle to the axis of the rod 22 at the prongs 30. In the closed position shown in FIG. 5, the step portion 42 of the step assembly 40 forms an angle of approximately 135° with the axis of the rod 22 at the prongs 30. In such a closed position, the fingers 46 contact the prongs 30 so as to firmly hold the weed 70 therebetween while removing the weed 70 from the ground 75.

The fastener 28 of the rod 22 is then inserted into and fasted to the means for fastening 18 of the lower end 12 of the elongated handle 10 and tightened to a point where the axis of the rod 22 at the prongs 30 is coplanar with the axis of the top end 14 of the handle 10, such that the top end 14 of the handle 10 forms an angle with the axis of the rod 22 at the prongs 30 of approximately 90°.

In use, a user inserts the prongs 30 slightly into a portion of ground 75 just in front of a weed 70 (FIG. 4). The user then uses one foot to step onto the step portion 42 to force the prongs 30 deeper into the ground 75. This also forces the step assembly 40 into the fully open position with respect to the prong assembly 20. Once the prongs 30 are sufficiently buried next to the roots of the weed 70, the user grasps the hand grip 16 and pulls towards himself such that the flange 50 of the step assembly 40 contacts the ground 75. At this point, as the user continues to pull the handle 10 towards himself, the step assembly 40 begins to be forced into its closed position, pressing the fingers 46 of the step assembly 40 around the weed 70. Simultaneously, the apparatus pivots around the contact point of the flange 50 and the ground 75, forcing the prongs 30 up and out of the ground 75. Finally, as the prongs 30 are pulled from the ground, the fingers 46 close completely around the weed 70 and the device lifts the weed 70 and its roots completely out of the ground 75 (FIG. 5). The user may, at this point in the process, optionally push the handle 10 forward, raise the prongs 30 slightly, and then pull the handle 10 backward again to grab the weed 70 above any dirt that may be attached to the roots of the weed 70 (not shown). At this point the user may shake the handle 10 to loosen dirt that remains on the roots of the weed 70. The leverage afforded by the elongated handle 10 facilitates the removal of the weed 70 even when the weed 70 is fairly large with deep roots, and even when the ground 75 is relatively dry and compact.

While a particular form of the invention has been illustrated and described, it will be apparent that various modifications can be made without departing from the spirit and scope of the invention. For example, portions of the apparatus may be manufactured with non-metallic materials of sufficient strength, or a single finger 46 may be included on the step assembly 40 as opposed to three fingers 46. Accordingly, it is not intended that the invention be limited, except as by the appended claims.

What is claim is:

1. A weed extraction tool, comprising;
   an elongated handle including at a lower end thereof a threaded receptacle aligned co-axially with the handle;
   a prong assembly, comprising a rod having at a lower end thereof a plurality of prongs, a threaded portion of the rod at an upper end thereof adapted to cooperate with the threaded receptacle of the elongated handle, and a pivot pin holder fixed between the upper and lower ends of the rod and mounted transversely to the axis of the rod, the pivot pin holder adapted for holding a pivot pin;
   a step assembly, comprising a step portion at one end thereof, a plurality of fingers at another end thereof, an opening in a top side thereof between the one and another ends thereof for receiving the rod of the prong assembly therethrough, and an opening in a side thereof between the one and another ends thereof for holding the pivot pin;
   whereby, with the rod of the prong assembly positioned through the opening in the top side of the step assembly, the pivot pin may be inserted through the openings in one of the sides of the step assembly, through the pivot pin holder of the prong assembly, through the other of the sides of the step assembly, and retained with a cotter pin, such that the prong assembly is pivotably retained by the prong assembly, the threaded portion of the rod engaged in the threaded receptacle of the handle with the rod and the handle aligned co-axially.

2. The weed extraction tool of claim 1 wherein the elongated handle includes an elastomeric hand grip fixed at a top end thereof.

3. The weed extraction tool of claim 2 wherein the top end of the elongated handle forms an angle $\beta$ with respect to the rest of the elongated handle, the angle $\beta$ being approximately 135°.

4. The weed extraction tool of claim 1 wherein the step portion of the step assembly further includes a flange at a distal end thereof, the flange angled away from a top side thereof.

5. The weed extraction tool of claim 1 wherein the prongs of the prong assembly form an angle $\alpha$ with respect to the rod of the prong assembly, the angle $\alpha$ being approximately 135°.

6. The weed extraction tool of claim 1 wherein the plurality of prongs comprises a pair of prongs.

7. The weed extraction tool of claim 1 wherein the plurality of prongs form a V-shape such that roots of a weed maybe wedged between the prongs and held firmly to facilitate the extraction of the weed from a portion of ground.

8. The weed extraction tool of claim 1 wherein the plurality of fingers comprises three fingers, such that the fingers can interlace with the prongs.

9. The weed extraction tool of claim 1 wherein the opening in the top side of the step assembly is elongated and of such a size as to allow pivoting of the step assembly only between approximately ten degrees and ninety degrees with respect to the prongs.

* * * * *